United States Patent
Grech et al.

(10) Patent No.: US 8,009,641 B2
(45) Date of Patent: Aug. 30, 2011

(54) DEVICE CONFIGURATION APPARATUS, SYSTEM, AND METHOD

(75) Inventors: Sandro Grech, Helsinki (FI); Kalle Ahmavaara, Helsinki (FI)

(73) Assignee: Nokia Corporation, Espoo (FI)

( * ) Notice: Subject to any disclaimer, the term of this patent is extended or adjusted under 35 U.S.C. 154(b) by 434 days.

(21) Appl. No.: 11/209,836

(22) Filed: Aug. 24, 2005

(65) Prior Publication Data

US 2006/0203787 A1    Sep. 14, 2006

(30) Foreign Application Priority Data

Mar. 9, 2005 (GB) .................................. 0504868.1

(51) Int. Cl.
*H04W 4/00* (2009.01)
(52) U.S. Cl. ...................... 370/338; 455/433; 455/435.1; 455/437
(58) Field of Classification Search .................. 370/328, 370/338, 401; 455/435.1, 436, 437, 432.1, 455/432.2, 433, 434
See application file for complete search history.

(56) References Cited

U.S. PATENT DOCUMENTS

| 6,501,746 | B1 | 12/2002 | Leung |
| 6,510,153 | B1 | 1/2003 | Inoue et al. |
| 6,857,009 | B1 * | 2/2005 | Ferreria et al. ............ 709/219 |
| 7,042,864 | B1 * | 5/2006 | Leung et al. ................ 370/338 |
| 2002/0159479 | A1 * | 10/2002 | Watanuki et al. ............ 370/466 |
| 2003/0099219 | A1 * | 5/2003 | Abrol et al. .................... 370/338 |
| 2004/0005910 | A1 * | 1/2004 | Tom ............................... 455/558 |
| 2004/0092260 | A1 * | 5/2004 | Thubert et al. ............ 455/435.1 |
| 2004/0133640 | A1 * | 7/2004 | Yeager et al. ................ 709/204 |
| 2004/0162892 | A1 * | 8/2004 | Hsu ............................... 709/221 |
| 2005/0083883 | A1 * | 4/2005 | Ho et al. ....................... 370/331 |
| 2005/0111380 | A1 * | 5/2005 | Adrangi et al. .............. 370/254 |

FOREIGN PATENT DOCUMENTS

| EP | 1 460 815 A1 | 9/2004 |
| JP | 11-308273 | 11/1999 |
| JP | 2003-520535 | 7/2003 |
| KR | 100911946 | 12/2007 |
| WO | 01/54437 | 7/2001 |
| WO | WO 02/063848 A2 | 8/2002 |
| WO | 2004/082236 | 9/2004 |

OTHER PUBLICATIONS

Faccin, Stefano et al., "*Diameter Mobile IPv6 Application*", Internet Engineering Task Force, XP015004098, Apr. 2003, pp. 1-33.
Notification of Reason for Rejection dated Feb. 22, 2010, issued by the Japanese Patent Office in connection with counterpart Japanese patent application No. 2008-500291.

* cited by examiner

*Primary Examiner* — Christopher M Brandt
(74) *Attorney, Agent, or Firm* — Mintz Levin Cohn Ferris Glovsky and Popeo, P.C.

(57) ABSTRACT

A method for configuring a device for communication is disclosed. In the method the device accesses a communication network where after it may be detected at a network element that the device needs to be provided with at least one configuration parameter. Information regarding the at least one configuration parameter is then determined and sent to the device. The device can then be configured in accordance with information received from the network element.

39 Claims, 5 Drawing Sheets

DEVICE CONFIGURATION APPARATUS, SYSTEM, AND METHOD

BACKGROUND OF THE INVENTION

1. Field of the Invention

The present invention relates to configuration of a communication device for communication via a data network.

2. Description of the Related Art

A communication system is a facility which enables communication between two or more entities such as user terminal equipment (mobile or fixed) or other communication device and/or network entities and other nodes associated with a communication system. The communication may comprise, for example, communication of voice, electronic mail (email), text messages, data, multimedia and so on.

A communication system typically operates in accordance with a given standard or with a given set of specifications which set out what the various elements of a system are permitted to do and how that should be achieved. For example, the standard or specification may define if the user, or more precisely user equipment, is provided with a circuit switched bearer or a packet switched bearer, or both. Communication protocols and/or parameters which should be used for the connection are also typically defined. For example, the manner in which communication should be implemented between the user equipment and the elements of the communication networks is typically based on a predefined communication protocol. In other words, a specific set of "rules" on which the communication can be based needs to be defined to enable the user equipment to communicate via the communication system.

The communication may be provided by a fixed line and/or wireless communication interface. An example of communication systems providing wireless communication are public land mobile networks (PLMN). Other examples include various wireless local area networks (WLANs) and satellite based systems. Examples of communication systems providing fixed line communications include public switched telephone networks (PSTN), cable networks, digital subscriber line (DSL) networks, and so on.

Communication systems providing wireless communication for user equipment enable at least some degree of mobility for the users thereof. More advanced mobility support can typically be added as an enhanced feature. An example of a wireless system is the public land mobile network (PLMN). PLMNs are commonly based on cellular technology. In cellular systems, a base transceiver station (BTS) or similar access entity services mobile communication device or user equipment (UE) via a wireless interface between these entities. The communication on the wireless interface between the user equipment and elements of the communication network can be based on an appropriate communication protocol. The operation of the base station apparatus and other apparatus required for the communication can be controlled by one or several control entities. The various control entities may be interconnected. One or more gateway nodes may be provided for connecting the cellular access network to other networks, for example to a public switched telephone network (PSTN) and/or other communication networks such as an IP (Internet Protocol) and/or other packet switched data networks. In such arrangements, the mobile communications network provides an access network enabling a user with wireless user equipment to access external networks, hosts, or services offered by specific service providers.

In a packet data network, a packet data carrier or bearer may be established to carry traffic flows over the network. An example of such a packet data carrier is a packet data protocol (PDP) context.

So called third generation (3G) communication systems are being introduced. These so called third generation systems use code division multiple access techniques. Example of third generation communication systems include system operating in accordance with specifications by a third generation partnership project (3GPP) or by third generation partnership project 2 (3GPP2).

Cellular packet data networks can be integrated with other wireless network systems such as WLAN. The integration may offer features such as common authentication, common billing, common services, and mobility across the access networks. Mobility across the access networks may be enabled through the use of an appropriate protocol, for example the mobile Internet Protocol (mobile IP).

An important feature of the mobile IP is that a communication device, commonly referred to as a mobile node (MN) may communicate via and move across visited networks, while still being reachable through its home IP address. The home IP address associates the communication device with its home network. While the mobile device resides away from its home network, a home agent tunnels IP packets of the mobile device to and from the mobile device. The home agent can be provided by a router agent.

With the introduction of the mobile IP, a care-of address that the communication device obtains from the visited network is hidden from protocol layers that are above the Mobile IP protocol layer. Mobile IP version 4 (IPv4) specification includes two main modes of operation: co-located care-of address mode, wherein the mobile device performs tunnelling/de-tunnelling operations and a second mode wherein a Foreign Agent entity in the visited network performs tunnelling/de-tunnelling operations on behalf of the mobile device. Mobile IP version 6 (IPv6) only supports the co-located care-of address mode. Mobile devices need to be configured with a home Internet Protocol (IP) address and a home agent IP address before they can make use of mobile IP functionality.

In the 3rd generation cellular network specifications by 3GPP a mobile device may connect to a 3GPP-WLAN multi-access network by setting up a PDP context through the GPRS network, or by setting up an IPsec tunnel through a WLAN network. When setting up a data carrier such as a PDP context the mobile device is assigned with an IP address during the PDP context activation procedure. When setting up an IPsec tunnel through a WLAN network, the mobile device is assigned an IP address by a network node, for example a Packet Data Gateway (PDG), during the signaling phase, for example during IKEv2 (Internet Key Exchange version 2) signalling. If an inter-access device-mobility solution based on Mobile IP is overlaid on top of this architecture, these addresses will represent Mobile IP care-of addresses. In order to operate, however, the Mobile IP client needs to be also configured with a Home Agent IP address and a Home IP Address. In 3rd generation cellular network specifications by 3GPP2 a mobile device may connect to a 3GPP2-WLAN multi-access network by setting up a Point-to-Point protocol (PPP) connection through a CDMA2000 packet data network, or by setting up an IPsec tunnel through a WLAN network. When setting up a data carrier such as a PPP connection the mobile device is assigned with an Internet Protocol (IP) address. When setting up an IPsec tunnel through a WLAN network, the mobile device is assigned an IP address by a network node, for example a Packet Data Interworking Function (PDIF), during the signaling phase, for example during IKEv2 (Internet Key Exchange version 2) signalling. If an inter-access device-mobility solution based on mobile IP is overlaid on top of this architecture, these addresses will represent mobile IP care-of addresses. In order to operate, however, the mobile IP client may also need to be configured with parameters such as a Home Agent IP address and a Home IP Address.

In practical systems, it might also be required that these parameters can be set up dynamically at a communication device, such as a mobile user equipment. However, current specifications for dynamic configuration of home agent address and/or dynamic assignment of home address require the use of a Foreign Agent in the visited network. It is an aim of embodiments of the present invention to define mechanisms for dynamic configuration of mobile IPv4 and mobile IPv6 parameters without requiring the assistance of a Foreign Agent.

SUMMARY OF THE INVENTION

In accordance with an embodiment a method for configuring a device for communication is provided. The method comprises steps of accessing a communication network by the device, detecting at a network element a need to provide the device with at least one configuration parameter, determining information regarding the at least one configuration parameter, and sending information regarding the at least one configuration parameter to the device. The device is then configured in accordance with information received from the network element.

Another embodiment provides a network element configured for detecting a need to provide a communication device with at least one configuration parameter, for determining information regarding the at least one configuration parameter, and for sending information regarding the at least one configuration parameter to the communication device.

In an embodiment a communication device for communication with a data network is provided. The communication device comprises an interface for communication with an access network, and a controller configured for including an indication that at least one configuration parameter is unknown to the communication device into signalling for setting up a data carrier, interpreting information received from the access network regarding the at least one configuration parameter to the communication device, and configuring the communication device in accordance with said information from the access network.

In a more specific embodiment an additional information element is included into a message for setting up a data carrier.

A predefined field of a message requesting for the data carrier may be left empty. Predefined octets of an IPv4 or IPv6 message may be left empty. Alternatively, a predefined indication may be included in a field of a message requesting for the data carrier.

The network element may comprise a gateway, for example a gateway of a GPRS or a CDMA2000 network or a gateway of a wireless local area network. The communication device may be a mobile device, for example a mobile IP node.

The configuration of the communication device may be dynamic.

Information regarding the at least one configuration parameter may be obtained by the network element from an external address data repository.

The embodiments of the invention may provide a way of dynamically configuring communication devices, for example communication devices using the mobile IP protocol in a 3GPP-WLAN multi-access network. A need for use of agents in the visited networks may be avoided. In addition, the same mechanism may be applicable for both mobile IPv4 and mobile IPv6 configuration.

BRIEF DESCRIPTION OF THE DRAWINGS

Further embodiments, details, advantages and modifications of the present invention will become apparent from the following detailed description of the preferred embodiments which is to be taken in conjunction with the accompanying drawings, in which.

For a better understanding of the present invention and how the same may be carried into effect, reference will now be made by way of example only to the accompanying drawings in which.

DETAILED DESCRIPTION OF THE PREFERRED EMBODIMENTS

To assist in understanding the invention, an explanation of a possible underlying communication system is given first with reference to elements as defined by the third generation partnership project (3GPP). It is noted that although certain embodiments will now be described by way of example, with reference to the exemplifying architectures of a cellular communication system comprising at least one 3GPP mobile communication network and of a wireless local area network, embodiments may be applied to any other suitable forms of communication systems than those illustrated and described herein.

Figure 1:
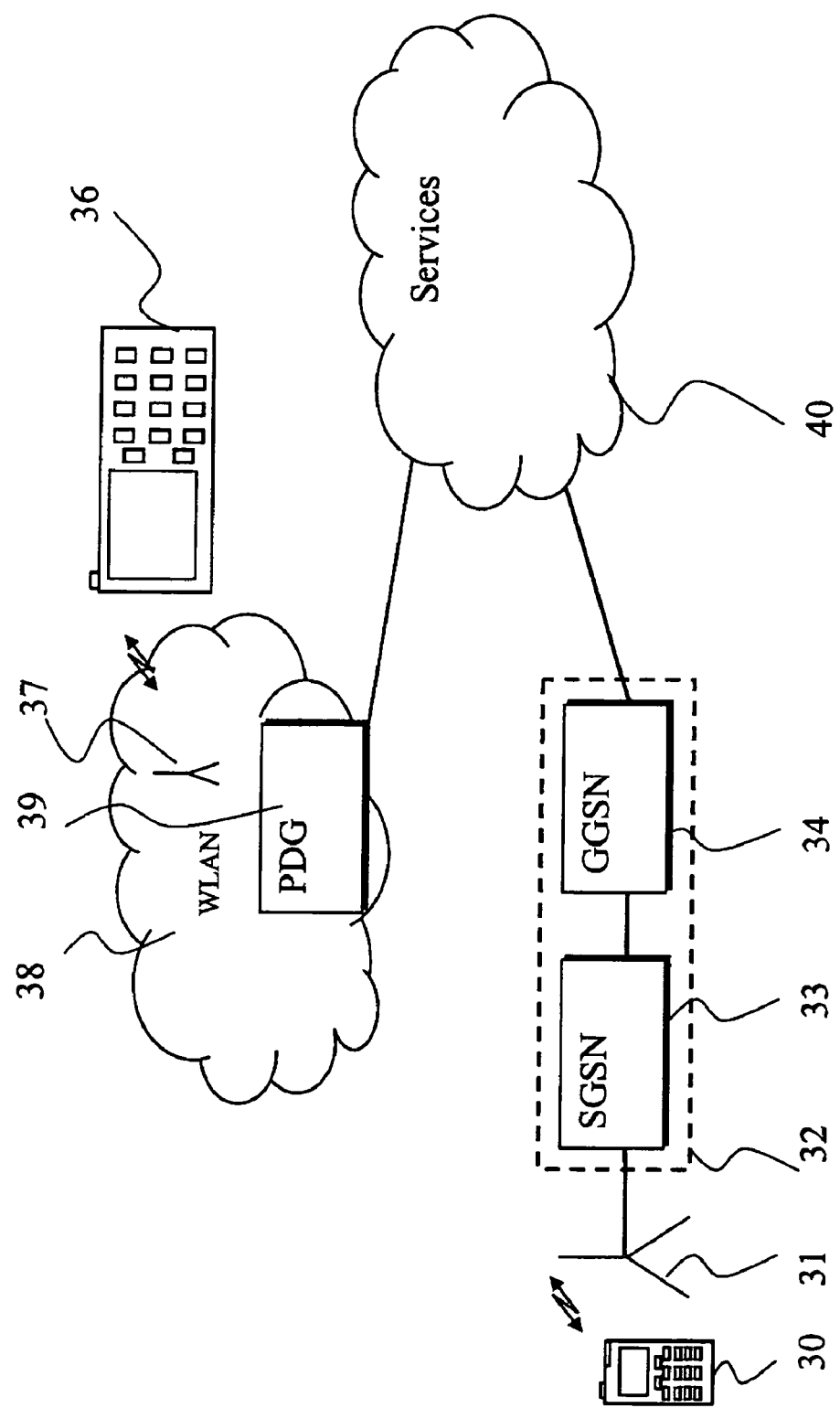
FIG. 1 shows a schematic view of a communications system comprising a plurality of networks.

A mobile device may use various services based on the mobile IP protocol. In FIG. 1 the services available for mobile devices are shown by a cloud 40 for simplicity. The services may be provided, for example, by means of the Internet, and thus the cloud 40 can be understood as, for example, denoting an IP based data network system.

A cellular system is typically arranged to serve a plurality of mobile user equipment, via a wireless interface between the user equipment and base stations of the communication system. In FIG. 1, some elements of a mobile communication network 32 are shown. In normal operation the cellular communication network provides packet switched data transmission in the packet switched domain between a support node 33 and mobile user equipment 30. The network 32 in turn is connected to external data networks, for example the Internet, via a gateway GPRS support node (GGSN) 34. The GPRS service allows transmission of packet data between mobile communication devices and external data networks. In addition to at least one gateway, a 3G network comprises also a number of packet data service nodes (SN). In the shown embodiment, the service nodes will be referred to as serving GPRS support nodes (SGSN).

Each of nodes 33 is connected to at least one mobile access network, typically to base station systems 31. The base stations 31 are arranged to transmit signals to and receive signals from a mobile device 30, via respective wireless interfaces. Correspondingly, each mobile device is able to transmit signals to and receive signals from the base stations via the wireless interface.

A communication device within a radio access network may communicate with a radio network controller via radio network channels which are typically referred to as radio bearers. Each mobile device such as a mobile user equipment may have one or more radio channels open at any one time with the radio network controller. Any appropriate mobile device adapted for Internet protocol (IP) communication maybe used to connect to the network. For example, a user may access the cellular network by means of communication devices such as a personal computer, personal data assistant (PDA), mobile station (MS), portable computer, combinations thereof or the like.

The mobile communication device can be used for various tasks such as making and receiving phone calls, for receiving and sending data from and to a network and for experiencing, for example, multimedia or other content. The communication device is typically provided with a processor and memory for accomplishing these tasks. The operation of the user equipment may be controlled by means of a suitable user interface such as key pad, voice commands, touch sensitive screen or pad, combinations thereof or the like.

Overall communication between user equipment in an access entity and the GGSN can be provided by a PDP (packet data protocol) context. Each PDP context provides a communication pathway between a particular user and a GGSN. Once the PDP context is established, it can typically carry multiple flows. Each flow normally represents, for example, a particular service and/or media component of a particular service. The PDP context therefore often represents a logical communication pathway for one or more flows across the network. To implement the PDP context between user equipment and the serving GPRS support node, radio access bearers need to be established which commonly allow for data transfer for the user equipment.

FIG. 1 shows also a WLAN network 38. Instead of PDP, a communication device 36 may access the communication system via the WLAN 38 based on an IPsec protocol. Each WLAN is provided with at least one access point 37 and a packet data gateway 39. The data carrier is provided by means of so called IPsec tunnel. Internet Key Exchange (IKEv2) signalling may be used to negotiate and manage IPsec tunnels between the mobile communication device 36 and the packet data gateway 39. The packet data gateway 39 may connect the WLAN to the IP based services network 40.

In the context of the examples the mobile IP home network is understood to be provided by an Internet Protocol (IP) subnetwork corresponding to the mobile device's home IP address. For example, IP addresses assigned by the GGSN 34 may be from a subnetwork proving "home network". In such case a mobile device would be "at home" when using the GPRS 32. For addresses assigned by the PDG 39 the mobile device would be "away from home". Alternatively, the home IP subnetwork can be seen as a subnetwork that the mobile device never actually visits. In such case a mobile device is always "away from home" when using the GPRS 32 or WLAN 38.

Figure 2:
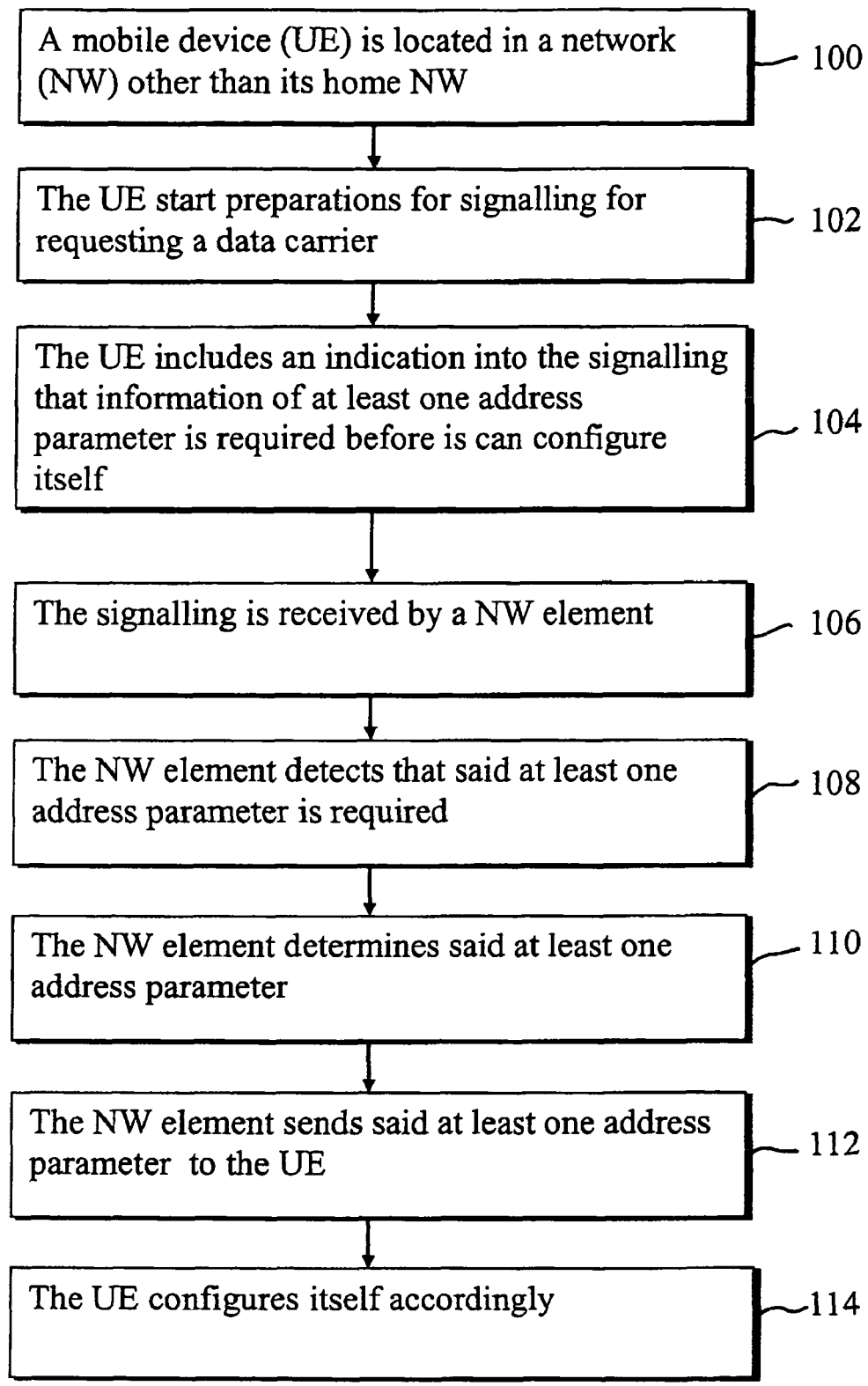
FIG. 2 shows a flowchart for operation in accordance with an embodiment of the present invention.

FIG. 2 shows an embodiment wherein a mobile device such as a mobile user equipment (UE) visiting a network other than the home network starts at step 102 to prepare appropriate messages for signalling a request for a data carrier. The mobile device detects that it is not aware of all required configuration parameters, and more particularly, that at least one address parameters is needed for configuration. Therefore the mobile device includes at step 104 an indication into the signalling that at least one address parameter is required for configuration thereof. The signalling is received by an appropriate network element, such as a gateway, at step 106.

In accordance with the principles of the present invention the network element detects at step 108 that the communication device needs to be provided with at least one configuration parameters. In the shown embodiment the network element detects that the signalling includes a predefined indication. The network element may then determine at step 110 appropriate address parameter(s), and send information regarding the at least one address parameter at step 112 to the mobile user equipment. The mobile user equipment may then set up itself in accordance with said information regarding the at least one address parameter at step 114.

The following embodiments present in more detail examples for mechanisms for dynamically allocating parameters such as a home agent address and home IP address to a visiting mobile device in the context of 3GPP-WLAN interworking multi-access environment. In each mechanism an indication that at least a parameter is required is piggybacked into signalling for setting up a data carrier.

The relevant mechanism may be selected based on the access method. In an exemplifying mechanism new information elements are introduced to a GPRS PDP context activation procedure signalling in order to enable a mobile device to request allocation of the necessary mobile IP parameters, and for the responding end to reply with appropriate values for these parameters. In another exemplifying mechanism new configuration attributes are included in payloads, for example 'IKEv2 configuration payloads', in order to enable a mobile device to request allocation of the necessary mobile IP parameters, and for the responding end to reply with appropriate values for these parameters.

Figure 3:
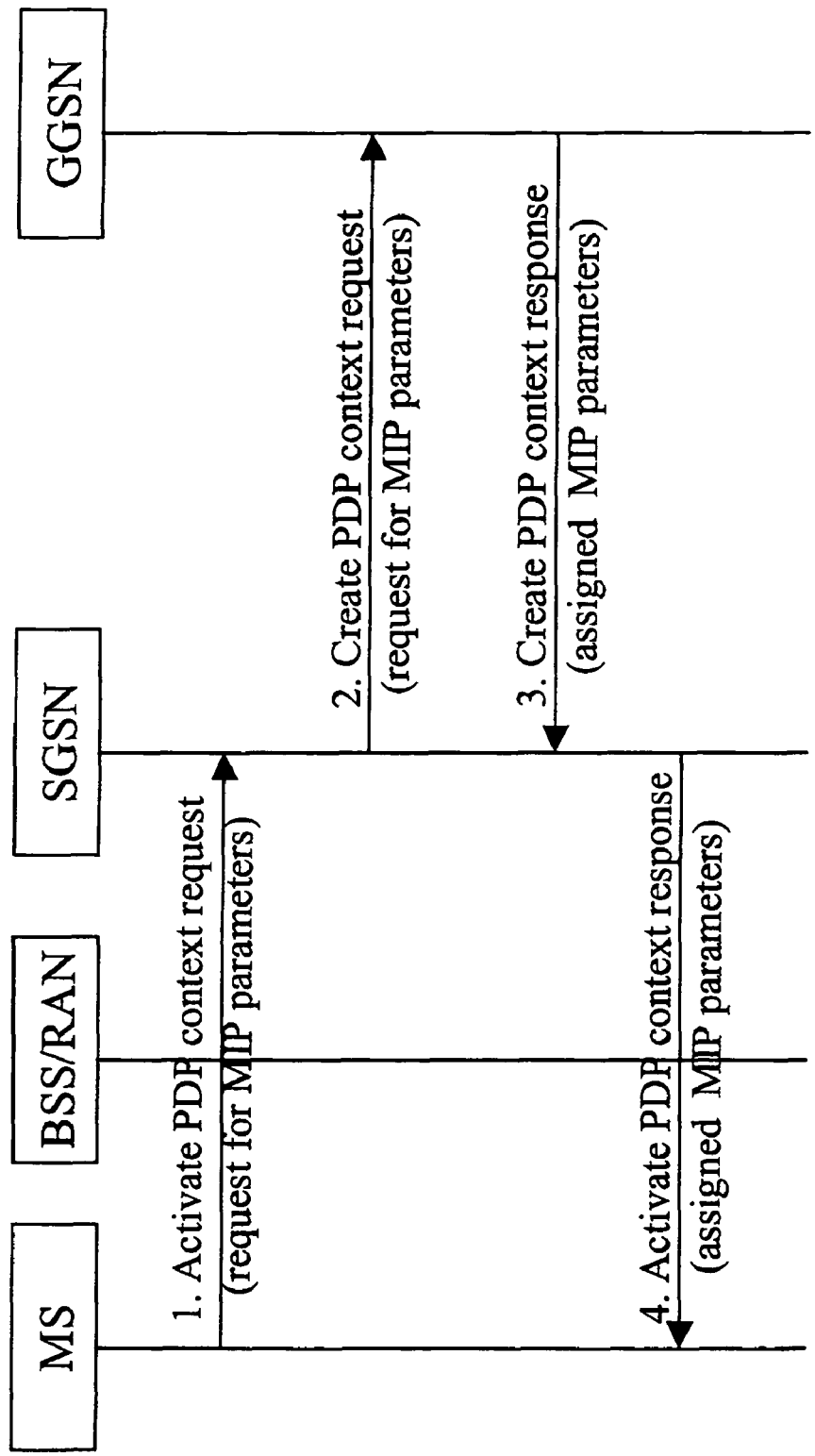
FIGS. 3 and 4 are signalling flowcharts in accordance with certain embodiments.
Figure 5:
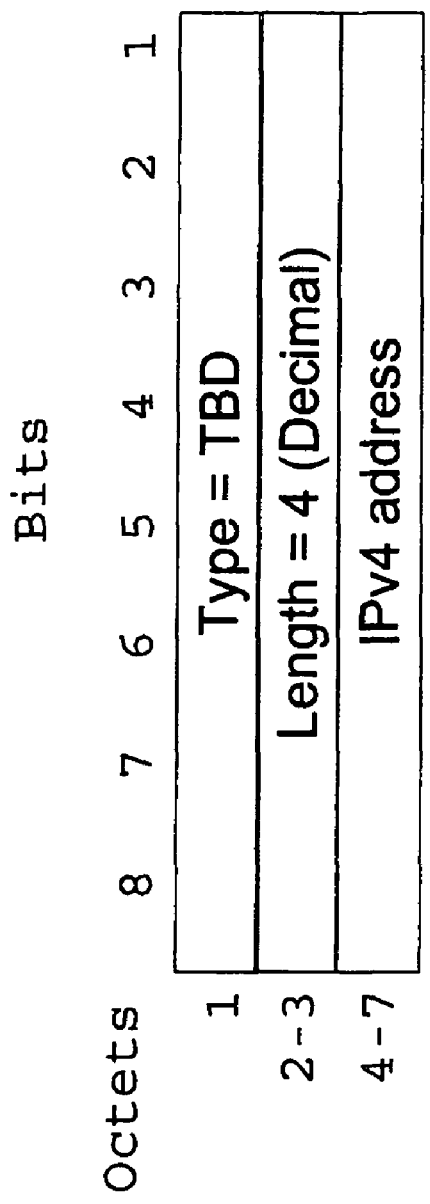
FIGS. 5 and 6 show examples of information elements that may be employed for performing the embodiments.
Figure 6:
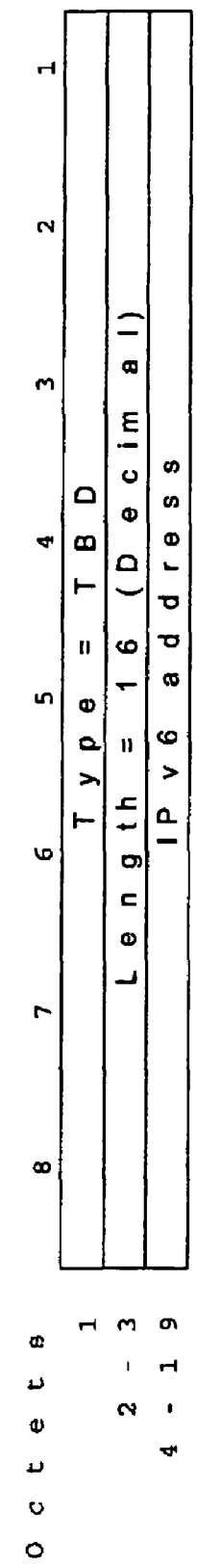

The following refers to the signalling flow chart of FIG. 3. When connecting through a GPRS network, the configuration of the mobile IP parameters may proceed in the following manner. If a mobile device intends to make use of mobile IP, the mobile device may include a Home Address and/or Home Agent IP address Information Element(s) in a PDP context management message 1, for example an 'Activation' or 'Modify' message. Examples of such information elements are shown in FIGS. 5 and 6. In order to indicate that it does not have the required information, the mobile device may leave the IP address field(s) empty. The mobile device then sends the information element together with the signalling 1 for setting up a data carrier in order to indicate that it is requesting the network to assign these parameters.

The message is then received by the SGSN, which in turn relays the request to the GGSN as message 2. The GGSN interprets the empty values in the information elements of message 2 as a request to allocate the respective parameters. The GGSN may determine appropriate values for the requested parameters by consulting intrinsic repositories, or by signalling towards a remote repository such as an Authentication, Authorization and Accounting protocol (AAA), for example RADIUS or DIAMETER or a Dynamic Host Configuration Protocol (DHCP) server.

Once the GGSN has determined the appropriate values, the GGSN may send a 'PDP Context Response' message 3 including the Home Address and/or Home Agent IP address Information Element(s) bearing the determined values. The message is received by the SGSN, which in turn relays the response towards the mobile device in message 4.

Upon reception of the 'PDP Context Response' message 4, the controller of the mobile device interprets the information elements carried within. The mobile device can then configure the parameters accordingly.

Figure 4:
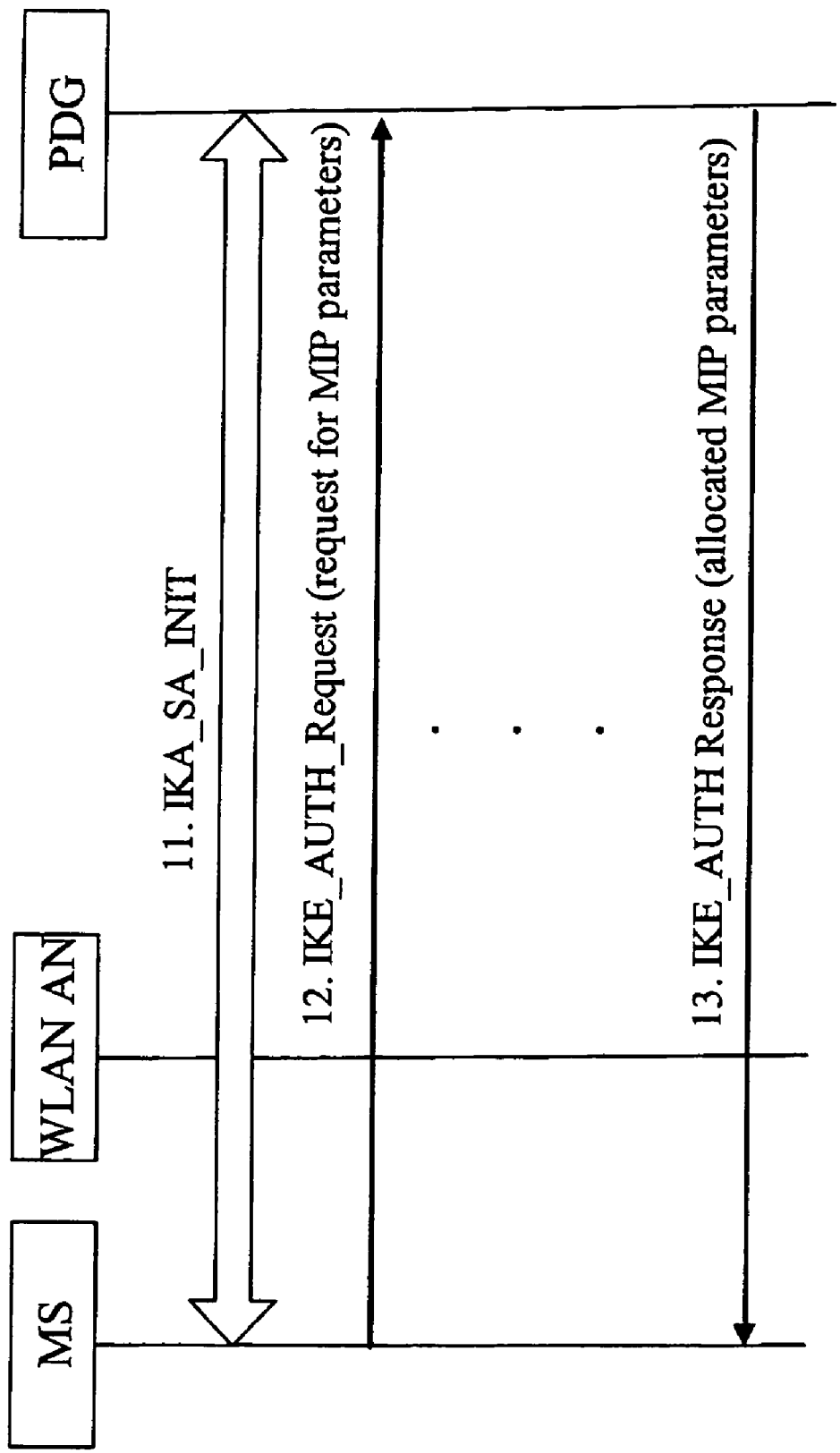

FIG. 4 shows a possible signalling flow when connecting through a WLAN or any other appropriate access technology by means of an IPsec connection. In such instance the configuration of Mobile IP parameters of a mobile device may proceed such that if the mobile device intends to make use of Mobile IP, the mobile device includes a 'Configuration Request Payload' element in its IKEv2 signalling procedures, see message 11. This 'Configuration Request Payload' element may include for example the following attribute types, as required:

| Attribute Type | Value | Length |
| --- | --- | --- |
| IP4_HOME_ADDRESS | TBD | 0 or 4 octets |
| IP4_HOME_AGENT_ADDRESS | TBD | 0 or 4 octets |
| IP6_HOME_ADDRESS | TBD | 0 or 16 octets |
| IP6_HOME_AGENT_ADDRESS | TBD | 0 or 16 octets |

The mobile device can indicate that it is requesting the network to configure these parameters by leaving the 'Value' field of the 'Configuration Request Payload' element empty. In the above example string 'TBD' indicates that there is no value, but that the information is 'to be decided'.

It is noted that the values for the attribute identifiers are a subject of IETF (Internet Engineering Task Force) standardization. As an alternative to standardized values, values in the private range may also be specified. Thus mutually consenting parties may implement this for example in the context of 3GPP-WLAN interworking based on Mobile IP.

The packet data gateway (PDG) may act as an IPsec Remote Access Server and thus receives the IKEv2 'Configuration Request Payload' element. The PDG may then reply at an appropriate stage with an IKEv2 'Configuration Response Payload' element including values for the requested parameters, see message 13. The PDG may determine the appropriate values by consulting intrinsic repositories, or by signalling towards a remote repository such as an Authentication, Authorization and Accounting (AAA) or DHCP server, for example.

An Authentication Authorization and Accounting server refers to a server that may communicate with the GGSN and/or PDG, using an appropriate protocol. Amongst other parameters, the AAA server can store mobile node's mobile IP parameters. The GGSN/PDG may contact an appropriate AAA server to request for the necessary configuration parameters for a mobile node of given identity. It is noted that this is just an example of a possibility of how the GGSN/PDG may fetch the required parameters.

The mechanisms discussed above may require some modifications of nodes such as the mobile device, SGSN, GGSN, and PDG. The PDP context engine implementation in the mobile device, SGSN and GGSN shall be capable of sending, interpreting, and making use of the new information element introduced in PDP context signalling. The GPRS Session management layer implementation in the mobile device and SGSN, and the GTP-C layer implementation in the SGSN and GGSN may need to support the above described extensions. The IKEv2 protocol implementation in the mobile device and PDG may need to be capable of sending, interpreting, and making use of the new configuration attributes.

In the following a couple of examples for Home Address and Home Agent address Information Elements for GPRS system are discussed. In the information element of FIG. 5 the type field is an 8 bit field identifying the type of information element. Two distinct values may be included for IPv4 Home Address and IPv4 Home Agent address, respectively. The length field is another 8 bit field indicating the length of the option. This can be set to 4. The IPv4 address field can be a 4 byte field which either contains the IPv4 Home Address or IPv4 Home Agent address assigned to the mobile device. If this filed is left empty, it indicates a request for assignment of an IPv4 Home Address or IPv4 Home Agent address. Each of these parameters may require an information element of its own.

FIG. 6 show a IPv6 Home Address and IPv6 Home Agent address Information Element. A difference to the IPv4 element is that the length field is set to 16. The IPv6 address filed is then a 16 byte field which normally contains the IPv6 Home Address or IPv6 Home Agent address assigned to the mobile device. If this field is left empty, it functions as an indication that an assignment of an IPv6 Home Address or IPv6 Home Agent address is requested.

The required data processing functions may be provided by means of one or more data processors. Appropriately adapted computer program code product may be used for implementing the embodiments, when loaded to a computer, for example a processor of the communication device and/or any of the other nodes associated with the operation. The program code means may, for example, perform the generation of messages and/or information elements, interpretation and so forth. The program code product for providing the operation may be stored on and provided by means of a carrier medium such as a carrier disc, card or tape. A possibility is to download the program code product via a data network.

It is noted that whilst embodiments of the present invention have been described in relation to communication devices such as mobile stations, embodiments of the present invention are applicable to any other suitable type of devices suitable for communication via a communications network.

It is also noted that although the above example relates a request-response model, the configuration information may be pushed to the device. For example, a network element may detect based on a database or its settings that configuration information needs to the provided for the communication device. In this model a specific request by the communication device is not necessary.

It is also noted that the address parameters discussed are only examples, and that any configuration parameters may be provided by a similar mechanism.

It is noted that even though the exemplifying embodiments shown and described in this disclosure use the terminology of the $3^{rd}$ generation (3G) WCDMA (Wideband Code Division Multiple Access) networks, such as UMTS (Universal Mobile Telecommunications System), CDMA2000 systems and wireless local area networks, embodiments of the proposed solution can be used in any communication system wherein advantage may be obtained by means of the embodiments of the invention, fort example for providing an access system for an IPsec tunnel.

It is also noted herein that while the above describes exemplifying embodiments of the invention, there are several variations and modifications which may be made to the disclosed solution without departing from the scope of the present invention as defined in the appended claims.

The invention claimed is:

1. A method comprising:
    detecting, at a network element, an indication included in a signal sent by a device that at least one configuration parameter required by the device is unknown, the at least one configuration parameter including at least a home agent address, wherein the device roams to a visited network other than a home network of the device, and wherein the network element is located at the visited network;
    determining by the network element at the visited network information regarding the at least one configuration parameter in response to detecting the indication included in the device that the at least one configuration parameter required by the device is unknown; and
    sending the information regarding the at least one configuration parameter to the device, wherein the device self-configures to set up a data carrier between the device and the network element based on the information from the network element, including at least the home agent address, without the use of a foreign agent.

2. The method as claimed in claim 1, wherein the detecting comprises detecting a need to provide the device with at least one address parameter, the determining comprises determining information regarding the at least one address parameter, and the sending the information comprises sending the information regarding the at least one address parameter.

3. The method as claimed in claim 1, wherein the detecting comprises detecting an indication of the need to provide the device with the at least one configuration parameter from the signal received from the device.

4. The method as claimed in claim 1, wherein the device is configured to include, in the signal, an indication that the at least one configuration parameter for setting up a data carrier is unknown to the device.

5. The method as claimed in claim 4, wherein the inclusion of the indication comprises including an additional information element into a message for setting up the data carrier.

6. The method as claimed in claim 4, wherein the inclusion of the indication comprises leaving empty a predefined field of a message requesting the data carrier.

7. The method as claimed in claim 4, wherein the inclusion of said indication comprises leaving empty predefined octets of any one of an internet protocol version 4 and internet protocol version 6 message.

8. The method as claimed in claim 4, wherein the inclusion of the indication comprises including a predefined indication in a field of a message requesting the data carrier.

9. The method as claimed in claim 1, wherein the at least one configuration parameter comprises information about at least one of a home agent address and a home address.

10. The method as claimed in claim 1, wherein the at least one configuration parameter comprises information about an Internet Protocol address of at least one of a home agent address and a home address.

11. The method as claimed in claim 1, wherein the network element comprises a gateway.

12. The method as claimed in claim 11, wherein the gateway comprises any one of a gateway of a general packet radio service network, a gateway of a code division multiple access 2000 network, and a gateway of a wireless local area network.

13. The method as claimed in claim 1, wherein the device comprises a mobile device.

14. The method as claimed in claim 13, wherein the information from the network element comprises at least one mobile IP parameter.

15. The method as claimed in claim 1, wherein the device self-configures dynamically.

16. The method as claimed in claim 1, wherein the determining of the information regarding the at least one configuration parameter comprises obtaining, by the network element, data from an external data repository.

17. A computer program embodied within a non-transitory computer readable medium, the computer program configured to control a processor to perform operations comprising:
detecting, at a network element, an indication included in a signal sent by a device that at least one configuration parameter required by the device is unknown, the at least one configuration parameter including at least a home agent address, wherein the device roams to a visited network other than a home network of the device, and wherein the network element is located at the visited network;
determining by the network element at the visited network information regarding the at least one configuration parameter in response to detecting the indication included in the signal that the at least one configuration parameter required by the device is unknown; and
sending the information regarding the at least one configuration parameter to the device, wherein the device self-configures to set up a data carrier between the device and the network element based on the information from the network element, including at least the home agent address, without the use of a foreign agent.

18. An apparatus comprising:
a detector configured to detect an indication included in a signal sent by a communication device that at least one configuration parameter required by the communication device is unknown, the at least one configuration parameter including at least a home agent address, wherein the communication device roams to a visited network other than a home network of the device, and wherein the detector is located at the visited network;
a determiner located at the visited network configured to determine the information regarding the at least one configuration parameter in response to the detected indication included in the signal that the at least one configuration parameter required by the communication device is unknown; and
a sender configured to send information regarding the at least one configuration parameter to the communication device,
wherein the communication device is configured to self-configure to set up a data carrier between the communication device and the network element based on the information from the network element, including at least the home agent address, without the use of a foreign agent.

19. The apparatus as claimed in claim 18, wherein the apparatus is configured to provide the communication device with the at least one configuration parameter in response to the communication device detecting that the at least one configuration parameter is needed.

20. The apparatus as claimed in claim 19, wherein the detector is configured to detect if the communication device has included in the signal an indication that the at least one configuration parameter is unknown to the device for setting up a data carrier.

21. The apparatus as claimed in claim 18, wherein the detector is configured to detect if an additional information element is included, by the communication device, into a request for a data carrier.

22. The apparatus as claimed in claim 18, wherein the detector is configured to detect if a predefined field of a message requesting a data carrier is left empty by the communication device.

23. The apparatus as claimed in claim 18, wherein the at least one configuration parameter comprises address information.

24. The apparatus as claimed in claim 23, wherein the address information comprises information about at least one of a home agent address and a home address.

25. The apparatus as claimed in claim 18, further comprising:
a gateway.

26. The apparatus as claimed in claim 25, wherein the gateway comprises any one of a gateway of a general packet radio service network, a gateway of a code division multiple access 2000 network, and a gateway of a wireless local area network.

27. The apparatus as claimed in claim 18, wherein the detector is configured to detect if a communication device needs to be provided with the at least one configuration parameter.

28. A system comprising:
a network element configured to detect an indication included in a signal sent by a communication device that at least one configuration parameter required by the communication device is unknown, the at least one configuration parameter including at least a home agent address, wherein the communication device roams to a visited network other than a home network of the communication device, the network element being located at the visited network, the network element configured to determine the information regarding the at least one configuration parameter in response to the detected indication included in the signal that the at least one configuration parameter required by the communication device is unknown, and to send information regarding the at least one configuration parameter to the communication device, wherein the communication device is configured to self-configure to set up a data carrier between the communication device and the network element based on the information from the network element, including at least the home agent address, without the use of a foreign agent.

29. An apparatus comprising:
an interface configured to communicate with an access network, wherein the apparatus roams to the access network, the access network being a visited network other than a home network of the apparatus; and
a controller configured to include in a signal an indication that at least one configuration parameter for setting up a data carrier is unknown to the apparatus, the at least one configuration parameter including at least a home agent address, interpret information received from the access network regarding the at least one configuration parameter to the apparatus, and configure the apparatus to set up the data carrier between the device and the network element in accordance with said information from the access network, including at least the home agent address, without the use of a foreign agent;
wherein the access network is configured to determine the information sent to the apparatus in response to receiving the signal with the indication that the at least one configuration parameter is unknown.

30. The apparatus as claimed in claim 29, wherein the interface comprises a radio part for wireless communication with the access network.

31. The apparatus as claimed in claim 30, wherein the apparatus comprises a mobile internet protocol node.

32. The apparatus as claimed in claim 31, wherein the information from the access network comprises at least one of a home agent internet. protocol address and a home internet protocol address.

33. The apparatus as claimed in claim 29, wherein the controller is configured to dynamically configure the apparatus based on configuration information from the access network.

34. A method comprising:
communicating, by a device, with an access network via an interface, wherein the device roams to the access network, the access network being a visited network other than a home network of the device;
including, in a signal, an indication that at least one configuration parameter for setting up a data carrier is unknown, the at least one configuration parameter including at least a home agent address;
interpreting information received from the access network regarding the at least one configuration parameter; and
self-configuring the device to set up a data carrier between the device and the interface accordance with said information from the access network, including at least the home agent address, without the use of a foreign agent;
wherein the access network is configured to determine the information sent to the apparatus in response to receiving the signal with the indication that the at least one configuration parameter is unknown.

35. The method as claimed in claim 34, wherein the interface comprises a radio part for wireless communication with the access network.

36. The method as claimed in claim 34, wherein the information from the access network comprises at least one of a home agent internet protocol address and a home internet protocol address.

37. The method as claimed in claim 34, wherein the self-configuring comprises dynamically self-configuring based on configuration information from the access network.

38. A computer program embodied within a non-transitory computer readable storage medium, the computer program configured to control a processor to perform operations comprising:
communicating, by the device, with an access network via an interface, wherein the device roams to the access network, the access network being a visited network other than a home network of the device;
including, in a signal, an indication that at least one configuration parameter for setting up a data carrier is unknown, the at least one configuration parameter including at least a home agent address;
interpreting information received from the access network regarding the at least one configuration parameter; and
self-configuring the device to set up the data carrier between the device and the interface in accordance with said information from the access network, including at least the home agent address, without the use of a foreign agent;
wherein the access network is configured to determine the information sent to the apparatus in response to receiving the signal with the indication that the at least one configuration parameter is unknown.

39. An apparatus comprising:
interfacing means for communicating with an access network, wherein the apparatus roams to the access network, the access network being a visited network other than a home network of the apparatus; and
controlling means for including, in a signal, an indication that at least one configuration parameter for setting up a data carrier is unknown to the apparatus, the at least one configuration parameter including at least a home agent address, for interpreting information received from the access network regarding the at least one configuration parameter to the apparatus, and for configuring the apparatus to set up the data carrier between the device and the interfacing means in accordance with said information from the access network, including at least the home agent address, without the use of a foreign agent;
wherein the access network is configured to determine the information sent to the apparatus in response to receiving the signal with the indication that the at least one configuration parameter is unknown.

* * * * *

UNITED STATES PATENT AND TRADEMARK OFFICE
CERTIFICATE OF CORRECTION

Page 1 of 1

| | |
|---|---|
| PATENT NO. | : 8,009,641 B2 |
| APPLICATION NO. | : 11/209836 |
| DATED | : August 30, 2011 |
| INVENTOR(S) | : Grech et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 440 days.

Signed and Sealed this
Thirteenth Day of March, 2012

David J. Kappos
*Director of the United States Patent and Trademark Office*